(12) United States Patent
Brothers, III et al.

(10) Patent No.: US 12,688,040 B2
(45) Date of Patent: Jul. 21, 2026

(54) DATA PROCESSING APPARATUS AND METHODS TENSOR TRANSFORM OPERATION

(71) Applicant: Arm Limited, Cambridge (GB)

(72) Inventors: John Wakefield Brothers, III, Calistoga, CA (US); Derek David Whiteman, Stockholm (SE)

(73) Assignee: Arm Limited, Cambridge (GB)

( * ) Notice: Subject to any disclaimer, the term of this patent is extended or adjusted under 35 U.S.C. 154(b) by 573 days.

(21) Appl. No.: 18/298,833

(22) Filed: Apr. 11, 2023

(65) Prior Publication Data

US 2024/0345903 A1    Oct. 17, 2024

(51) Int. Cl.
G06F 9/30 (2018.01)
G06F 7/76 (2006.01)
(Continued)

(52) U.S. Cl.
CPC ............ G06F 9/30036 (2013.01); G06F 7/78 (2013.01); G06F 9/30007 (2013.01); G06F 9/544 (2013.01); G06F 7/76 (2013.01)

(58) Field of Classification Search
CPC ... G06F 9/30036; G06F 9/300036; G06F 7/78
See application file for complete search history.

(56) References Cited

U.S. PATENT DOCUMENTS 10,866,786 B2 * 12/2020 Sade .................. G06F 9/30036
2017/0177355 A1    6/2017 Ould-Ahmed-Vall
(Continued)

FOREIGN PATENT DOCUMENTS

WO    20060033056 A2    3/2006

OTHER PUBLICATIONS

GB Application No. GB2403623.8 Combined Search and Examination Report Under Sections 17 and 18(3) dated Dec. 24, 2024, 10 pages.

(Continued)

*Primary Examiner* — Lewis A Bullock, Jr.
*Assistant Examiner* — John Robert Dakita Ewald
(74) *Attorney, Agent, or Firm* — Berkeley Law & Technology Group, LLP

(57) ABSTRACT

The present disclosure relates to a data processing apparatus for a processing resource to perform a transform operation on an input tensor for the processing resource, said input tensor being formed of a plurality of blocks, each block being a portion of said input tensor capable of being operated on independently of each other, said data processing apparatus comprising: communication circuitry to communicate with a control module and a shared storage of said processing resource; processing circuitry to perform said transform operation, said processing circuitry comprising sub-block processing circuitry and transformation circuitry; and a local storage to store transform operation output from said processing circuitry; wherein said communication circuitry is configured to: receive one or more transform parameters; read a first input sub-block from said shared storage, said first input sub-block being a portion of a first block of said input tensor corresponding to a processing unit of said processing circuitry; and write a first output sub-block to said shared storage, wherein said sub-block processing circuitry is configured to: divide said first block of said input tensor into one or more input sub-blocks capable of being operated on independently of each other based on said one or more transform parameters; and wherein said transformation circuitry is configured to: perform said transform operation on said first input sub-block based on said one or more transform parameters to generate said first output sub-block; and write said first output sub-block to said local storage.

18 Claims, 15 Drawing Sheets

(51) Int. Cl.
 *G06F 7/78* (2006.01)
 *G06F 9/54* (2006.01)

(56) References Cited

U.S. PATENT DOCUMENTS

| | | | | |
|---|---|---|---|---|
| 2018/0341484 A1* | 11/2018 | Fowers | ................ | G06F 9/3893 |
| 2021/0216315 A1 | 7/2021 | Toll | | |
| 2022/0309336 A1* | 9/2022 | Minkin | .................. | G06N 3/063 |
| 2022/0405348 A1* | 12/2022 | Lichtenau | ............... | G06F 17/16 |
| 2024/0169472 A1* | 5/2024 | Edwards | ................ | G06F 9/544 |

OTHER PUBLICATIONS

Bedichek, "Some Efficient Architecture Simulation Techniques", Winter 1990 USENIX Conference, 12 pages.

\* cited by examiner

Simulator Implementation

DATA PROCESSING APPARATUS AND METHODS TENSOR TRANSFORM OPERATION

FIELD OF THE INVENTION

The present technology relates generally to tensor processing.

BACKGROUND

Conventionally, when a processing resource (e.g. an accelerator such as a graphics processing unit, GPU, or a neural processing unit, NPU), requires transform operations to be performed on a data tensor (multidimensional data array), the data tensor is sent to a host processor (e.g. a central processing unit, CPU) and the required transform operations are executed on the host processor, then a resulting data tensor that is the processing output of the transform operations is sent back to the requesting processing resource. Transform operations may be required, for example, in the context of graphics processing, machine learning, etc. Such transform operations may for example include transposing an input tensor in one or more dimensions, tiling one or more elements of the input tensor, or padding the input tensor with one or more padding values, etc., may need to be performed on data arrays to rearrange/manipulate the data. In an example, in machine learning accelerator hardware, evaluation results of a model in the form or one or more tensors are sent from the accelerator hardware to the CPU, which applies the necessary transform operations to the evaluation results and then transmits the transform operations output back to the accelerator hardware.

However, in the conventional approach, data is transmitted back and forth between a processing resource and the host processor, consuming bandwidth and processing and memory resources on the host processor.

There is therefore scope for improving data processing apparatus and methods for performing transform operations on tensors.

BRIEF DESCRIPTION OF THE DRAWINGS

Embodiments will now be described, with reference to the accompanying drawings, in which.

DETAILED DESCRIPTION

Figure 1:
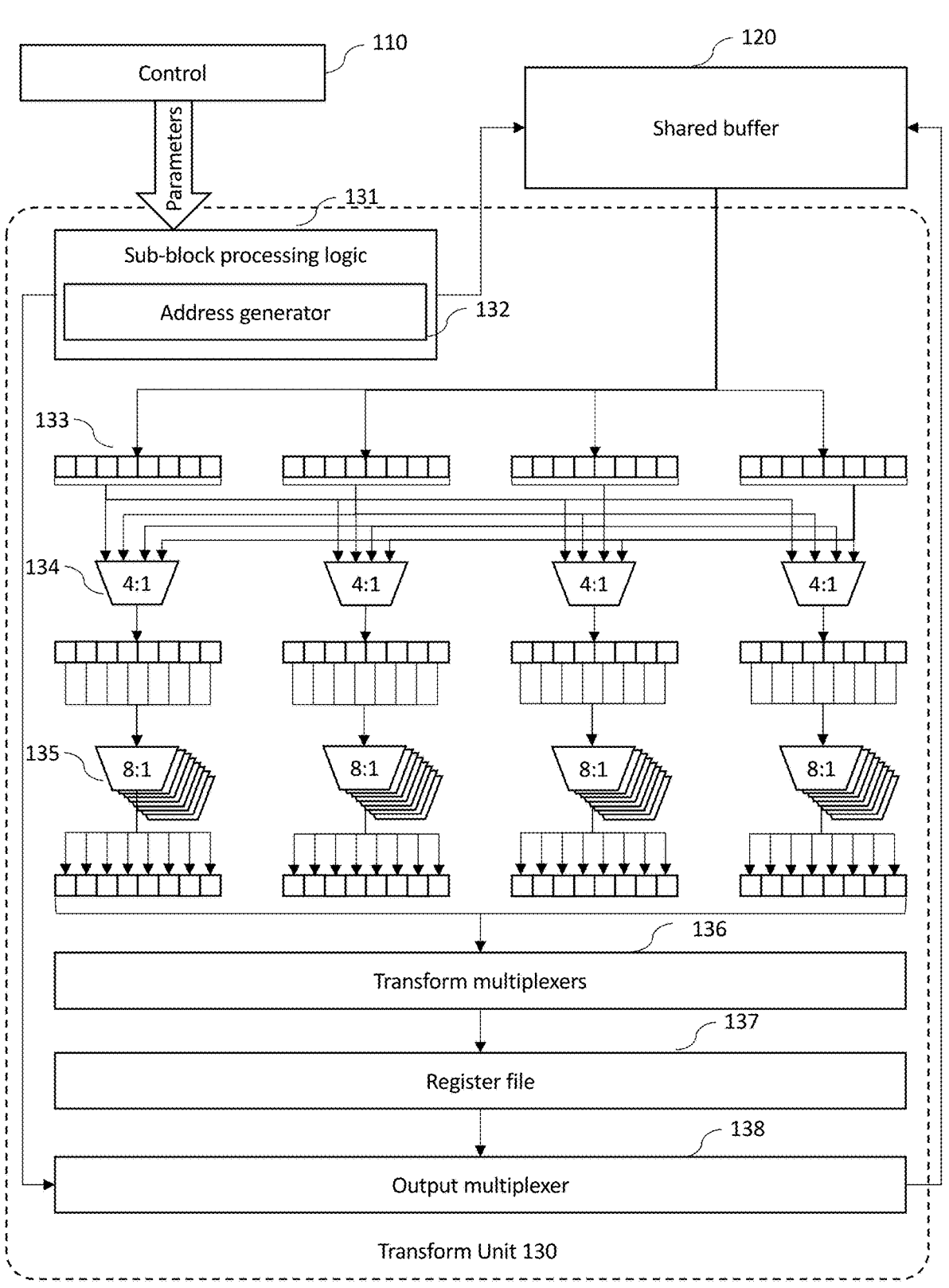
FIG. 1 shows an exemplary tensor transform unit according to an embodiment.

In view of the foregoing, an aspect of the present technology provides a data processing apparatus for a processing resource to perform a transform operation on an input tensor for the processing resource, said input tensor being formed of a plurality of blocks, each block being a portion of said input tensor capable of being operated on independently of each other, said data processing apparatus comprising: communication circuitry to communicate with a control module and a shared storage of said processing resource; processing circuitry to perform said transform operation, said processing circuitry comprising sub-block processing circuitry and transformation circuitry; and a local storage to store transform operation output from said processing circuitry; wherein said communication circuitry is configured to: receive one or more transform parameters; read a first input sub-block from said shared storage, said first input sub-block being a portion of a first block of said input tensor corresponding to a processing unit of said processing circuitry; and write a first output sub-block to said shared storage, wherein said sub-block processing circuitry is configured to: divide said first block of said input tensor into one or more input sub-blocks capable of being operated on independently of each other based on said one or more transform parameters; and wherein said transformation circuitry is configured to: perform said transform operation on said first input sub-block based on said one or more transform parameters to generate said first output sub-block; and write said first output sub-block to said local storage.

Another aspect of the present technology provides computer-implemented method of performing a transform operation on an input tensor by a data processing apparatus for a processing resource, said input tensor being formed of a plurality of blocks, each block being a portion of said input tensor capable of being operated on independently of each other, said method comprising: communicating by communication circuitry with a control module and a shared storage of said processing resource; performing by processing circuitry said transform operation, said processing circuitry comprising sub-block processing circuitry and transformation circuitry; and storing by a local storage transform operation output from said processing circuitry; wherein said method further comprises: receiving by said communication circuitry one or more transform parameters; dividing by said sub-block processing circuitry a first block of said input tensor into one or more input sub-blocks based on said one or more transform parameters, each input sub-block being a portion of said first block of said input tensor corresponding to a processing unit of said processing circuitry and capable of being operated on independently of each other; reading by said communication circuitry a first input sub-block from said shared storage; and performing by said transformation circuitry said transform operation on said first input sub-block based on said one or more transform parameters to generate a first output sub-block; storing by said transformation circuitry said first output sub-block to said local storage; and writing by said transformation circuitry said first output sub-block to said shared storage.

A further aspect of the present technology provides A computer program comprising instructions for controlling a host data processing apparatus to provide an instruction execution environment to perform a transform operation on an input tensor, said input tensor being formed of a plurality of blocks, each block being a portion of said input tensor capable of being operated on independently of each other, said instruction execution environment comprising: communication program logic to communicate with a control module and a shared storage of said host data processing apparatus; processing program logic to perform said transform operation, said processing circuitry comprising sub-block processing program logic and transformation program logic; and local storage to store transform operation output from said processing circuitry; wherein said communication program logic is configured to: receive one or more transform parameters; read a first input sub-block from said shared storage, said first input sub-block being a portion of a first block of said input tensor corresponding to a processing unit of said processing program logic; and write a first output sub-block to said shared storage, wherein said sub-block processing program logic is configured to: divide said first block of said input tensor into one or more input sub-blocks capable of being operated on independently of each other based on said one or more transform parameters; and wherein said transformation program logic is configured to: perform said transform operation on said first input sub-block based on said one or more transform parameters to generate said first output sub-block; and write said first output sub-block to said local storage.

Embodiments of the present technology may be implemented in a processing resource to perform transform operations on input data tensors for the processing resource. Such a processing resource generally comprises a shared storage (e.g. a shared buffer) for storing an input data tensor on which a transform operation is to be performed, and a control module, which controls the transform operation through the use of one or more (e.g. a set of) transform parameters that specify the transform operation to be performed on the input data tensor. A data processing device according the embodiments comprises communication circuitry for communicating with a control module and a shared storage of the processing resource, processing circuitry for performing transform operations, and a local storage (e.g. one or more registers) for storing processing results following performance of a transform operation by the processing circuitry. The processing circuitry comprises sub-block processing circuitry and transformation circuitry. Upon the communication circuitry receiving the transform parameters, the sub-block processing circuitry divides at least a portion (a block) of the input tensor into one or more input sub-blocks based on the transform parameters, wherein an input sub-block being formed corresponds to a unit of data required by the processing circuitry to perform the transform operation and each input sub-block can be operated on or processed independently of each other. Out of the one or more input sub-blocks as divided by the sub-block processing circuitry, the communication circuitry reads a first input sub-block from the shared storage, and the transformation circuitry performs the transform operation on the first input sub-block based on the received transform parameters to generate a first output sub-block. The transformation circuitry then stores the generated first output sub-block to the local storage, which is written by the communication circuitry to the shared storage.

According to embodiments of the present technology, a dedicated data processing device (tensor transform unit) is provided to a processing resource for performing tensor transform operations for the processing resource. In doing so, the transform operations are performed at or near the processing resource, which reduces data traffic to and from the processing resource and reduces the amount of data accesses required for the transform operations. Through a reduction of data traffic, it is possible to conserve bandwidth and improve processing efficiency. Moreover, according to embodiments of the present technology, a transform operation on an input tensor may be processed in portions or blocks that have no interdependencies, and a block of the input tensor is divided into one or more sub-blocks that can each be processed independently by the sub-block processing circuitry. In doing so, the loading of a portion of the input tensor to generate a corresponding portion of the output tensor only requires a small amount of internal storage (local storage) at the data processing device. Thus, present embodiments are able to process very large tensor that would otherwise not fit into the internal storage especially if the transform output is also stored, albeit temporarily, in the internal storage. Further, processing an input tensor in portions that have no interdependencies allow the portions to be processed in parallel by multiple, identical or similar, data processing units in parallel.

In some embodiments, the sub-block processing circuitry may be further configured to divide the first input sub-block into a plurality of bricks, each brick being a portion of said first input sub-block capable of being operated on independently of each other. For example, the sub-block processing circuitry may be configured to divide said first input sub-block into a plurality of bricks such that each brick corresponds to a data array size capable of being read from or written to said shared storage of said processing resource in a single processing cycle.

In some embodiments, the one or more transform parameters may comprise an indication for a number of bricks required for the transform operation, and the sub-block processing circuitry may be configured to select the number of bricks required to form the first input sub-block.

In some embodiments, each of said plurality of bricks may be a multidimensional data array, and the transformation circuitry may be configured to perform the transform operation on the first input sub-block by processing one of the required number of bricks in each dimension of the multidimensional data array in turn.

In some embodiments, the sub-block processing circuitry may comprise address generating circuitry to generate address information specifying the one or more input sub-blocks of the first block of the input tensor.

In some embodiments, the communication circuitry may be configured to send the address information specifying one or more input sub-blocks to the shared storage.

In some embodiments, the communication circuitry may be configured to read the first input sub-block from the shared storage based on the address information.

In some embodiments, the transformation circuitry may be configured to arrange the first output sub-block in the local storage based on the address information.

In some embodiments, the communication circuitry may be configured to write the first output sub-block to the shared storage based on the address information.

In some embodiments, the processing circuitry may further comprise output circuitry to select data stored in the local storage based on the one or more transform parameters to be written as the first output sub-block to the shared storage based on the address information.

In some embodiments, the address information may comprise data positions of the one or more input sub-blocks in the shared storage and data positions of the first output sub-block in the local storage.

In some embodiments, the one or more transform parameters may comprise one or more parameters specifying an input tensor size, one or more parameters specifying an output tensor size, a location of said shared storage, one or more parameters defining said transform operation, one or more parameters specifying traversal through said input and output tensors to divide into said one or more sub-blocks, or any combination thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

Embodiments of the present technology provide data processing devices that can be provided to a processing resource to perform transform operations on input data tensors for the processing resource and corresponding computer-implemented methods of performing the transform operations. The processing resource comprises a shared storage (e.g. a shared buffer) for storing an input data tensor on which a transform operation is to be performed, and a control module, which controls the transform operation through the use of one or more (e.g. a set of) transform parameters that specify the transform operation to be performed on the input data tensor. A data processing device according the embodiments comprises communication circuitry for communicating with a control module and a shared storage of the processing resource, processing circuitry for performing transform operations, and a local storage (e.g. register) for storing processing results following performance of a transform operation by the processing circuitry. The processing circuitry comprises sub-block processing circuitry and transformation circuitry. Upon the communication circuitry receiving the transform parameters, the sub-block processing circuitry divides at least a portion (a block) of the input tensor into one or more input sub-blocks based on the transform parameters, such that an input sub-block being formed corresponds to a unit of data required by the processing circuitry to perform the transform operation. According to the one or more input sub-blocks as divided by the sub-block processing circuitry, the communication circuitry reads a first input sub-block from the shared storage, and the transformation circuitry performs the transform operation on the first input sub-block based on the received transform parameters to generate a first output sub-block. The transformation circuitry then writes the generated first output sub-block to the local storage, which is read by the communication circuitry to write the first output sub-block to the shared storage.

According to embodiments of the present technology, a dedicated tensor transform unit is provided to a processing resource for performing tensor transform operations for the processing resource. Unlike conventional approaches in which transform operations are performed by the host processor, performing the transform operations at or near the processing resource reduces data traffic to and from the processing resource and reduces the amount of data accesses required for the transform operations. Thus, it is possible to conserve both host processor and processing resource bandwidth, and reduce the host processor processing load, thereby improving the efficiency of processing tensor transform operations.

Moreover, according to embodiments of the present technology, a transform operation on an input tensor may be processed in blocks that are portions of the input tensor, and a block of the input tensor can be further broken down or divided into one or more sub-blocks by the sub-block processing circuitry. In doing so, it is possible to load a portion of the input tensor and generate a corresponding portion of the output tensor using only a small amount of internal storage; in other words, only a small local storage is required for the tensor transform unit. Thus, present embodiments are able to process very large tensors that would otherwise not fit into the internal storage, especially if stored together with the transform output. Further, processing an input tensor in blocks that have no interdependencies allow the blocks to be processed in parallel by multiple, identical or similar, processing units (such as the tensor transform unit of the embodiments) in parallel.

In the present approach, a tensor transform unit may be provided to a processing resource for processing an input tensor for the processing resource. When commands to perform a transform operation on an input tensor are issued, e.g. from an API at a host processor, to the processing resource, a compiler at the host processor processes the commands to schedule processing tasks for the transform operation, and a driver at the host processor sends the commands and transform parameters that define the transform operation to a control unit of the processing resource at runtime. For example, the input tensor may be a multidimensional, e.g. four-dimensional, tensor, the four dimensions may e.g. be N, batch, H, height, W, width, and C, channel. The transform parameters may for example include parameters that specify an input tensor size, an output tensor size, a shared storage location, parameters that specify traversal through input and output tensors to subdivide into sub-blocks (i.e. parameters that specify the order in which each dimension of the multidimensional tensor is processed or output by the tensor transform unit, see examples discussed below. It should be noted that input order and output order need not be the same and can be different if desired), and parameters that define the transform operation, for example, an indication that specifies a transform operation to be performed and a number of elements required to perform the transform operation. The input tensor may be divided into a plurality of multidimensional portions or blocks. The control unit then loads the input tensor, as individual blocks, into an internal memory (shared storage) of the processing resource, and initiates the transform operation on the blocks of input tensor in an order as specified by the transform parameters generated by the compiler. According to embodiments, the tensor transform unit is configured with nested loop logic that uses the received transform parameters to loop through the multidimensions (e.g. 4) of a block, or in other words the tensor transform unit processes each of the multidimensions in turn, to first divide an input block into one or more sub-blocks. The tensor transform unit may receive the transform parameters e.g. from the control unit, from the driver at the host processor, retrieve from a shared storage of the processing resource, or from any other suitable sources as required. For example, each block may be divided in a multiple of 16 sub-blocks, the size of an input sub-block may depend on the transform operation and may be determined by the transform parameters, and a maximum size of an input sub-block may correspond to a maximum amount of data, e.g. 256 bytes, that can be stored within a register file in a local storage of the tensor transform unit. Then an input sub-block is dispatched, from the internal memory of the processing resource (shared buffer or shared storage), to the transform unit. In an inner loop of the nested loop logic, the input sub-block is processed as one or more bricks, each brick may e.g. be a two-dimensional portion of the input sub-block. For example, a brick may be 32 bytes in size (other sizes are of course possible as desired), and may be formed of e.g. a 1×1×4×8 i.e. 32-bit element, 1×1×4×4 i.e. 16-bit elements, or 1×1×4×2 i.e. 8-bit elements. The number of input bricks required to generate an output sub-block depends on the transform operation and may be specified or indicated in the transform parameters. Thus, in at least some embodiments, the size of an input sub-block may be determined by the number of input bricks required by a transform operation to generate each brick of a corresponding output sub-block. For example, an input sub-block is four input bricks in size if the transform operation requires the processing of four input bricks to generate at least one whole brick of a corresponding output sub-block. According to the embodiments, a block is divided into a plurality of sub-blocks to improve or optimize the efficient transfer of tensor data to the internal storage (shared buffer) by ensuring that transformation outputs are written in whole bricks. In the innermost loop, an input brick is loaded and the transform operation is performed on the input brick to generate a brick or a portion of a brick of an output sub-block, which is written back to the shared storage. If more than one brick is required to be processed by the transform operation in order to generate whole bricks of the output sub-block, a next input brick (of the current input sub-block) is loaded to generate another portion (or the remaining portion) of the bricks of the output sub-block. The output sub-block is completed when all levels of looping of the nested loop logic, controlled by the transform parameters, have been executed. Other input sub-blocks may then be processed to construct a corresponding output block; thereafter, another block may be processed to construct a larger region of the output tensor. In some embodiments, multiple transform units may be implemented in parallel to process an input tensor, each to process one or more blocks of the input tensor to construct an output tensor in the shared storage. For example, there may be 8 transform units processing an input tensor to generate 1/8 of an output tensor in parallel.

FIG. 1 shows an exemplary tensor transform unit (data processing device) 130 in a processing resource (not shown). The transform unit 130 receives, via suitable communication circuitry (not shown), transform parameters from a control unit 110 of the processing resource to perform a transform operation on an input tensor. The tensor transform unit 130 comprises processing circuitry that includes sub-block processing logic 131, which uses the transform parameters to process an independent block (portion) of the input tensor (having no interdependencies with respect to other blocks) to divide the block into one or more sub-blocks that can be operated on or processed independently of each other. Each sub-block is further divided into one or more multidimensional portions, or bricks (e.g. in the present example, a brick has one dimension less than the sub-block; however, a brick may have the same or fewer number of dimensions as the sub-block). In an example, the size of a brick may be defined based on a unit of data that can be read or written from/to a shared buffer (shared storage) 120 of the processing resource in one processing cycle. The sub-block processing logic 131 comprises an address generator 132, which generates addresses for each of the one or more bricks, and the sub-block processing logic 131 sends the address information to the shared buffer 120 in order to load a brick from the or store a brick to the shared buffer 120. The sub-block processing logic 131 further sends the address information to an output multiplexer 138, which uses the address information to write processing results to the shared buffer 120.

The processing circuitry of the transform unit 130 further comprises transformation circuitry, which can include one or more stages of tensor operations, for performing the transform operation on the input sub-block. Elements of an input brick of the input sub-block are loaded into input registers 133 of the transform unit 130 based on the address information. In the examples discussed herein, input sub-blocks of four dimensions N, H, W and C are assumed. In the example below, the input brick has a size of 1×1×4×8 bytes (in the four dimensions N, H, W and C), where the eight 8-bit channels are arranged in an X-direction, such that each X-element comprises eight channels. Other arrangements of the channels of same size input brick are of course possible, for example four 16-bit channels or two 32-bit channels. In the present example, the input brick is processed by an X-alignment stage 134, which, in the present example, comprises four 4:1 multiplexers each for taking the four X-elements as input to output one X-element to the next stage. For example, an X-alignment 4:1 multiplexer may output bytes 16:23 corresponding to channels 0:7 of X=2, or output bytes 24:31 corresponding to channels 0:7 of X=3. Then, the output of the X-alignment stage 134 is processed by a C-alignment stage 135, which reverses, rotates or otherwise rearranges whole bytes within a group of eight bytes. In the present example, the C-alignment stage 135 comprises eight 8:1 multiplexers for each group of eight input bytes to output eight rearranged bytes to the next stage. For example, a C-alignment 8:1 multiplexer may take bytes 0:7 as input and output rearranged bytes 7, 6, 5, 4, 3, 2, 1, 0 or any other ordering of the eight input bytes. The operations performed by the X-alignment stage 134 and C-alignment stage 135 may for example include rotating, reversing or otherwise rearranging, reordering, copying, selecting, one or more elements of an input brick in the corresponding dimension. Then, the output of the C-alignment stage 135 is processed by transform multiplexer 136, which performs transform processing such as transpose on the C-alignment output. The configuration of the transform multiplexer 136 would be clear to a skilled reader and will not be described in detail here. After processing by all the stages, the transform multiplexer 136 write the processing result to a register file 137. Three processing stages 134, 135 and 136 are shown in the present example for the purpose of illustration only. However, it will be appreciated that fewer or more than three stages are also possible as desired and have been contemplated. For example, an additional Y-alignment stage (in the H-dimension) may be included, or one or more of the X-alignment stage 134, C-alignment stage 135 and/or transform multiplexer 136 may be removed, deactivated or passed through or be replaced by the Y-alignment stage, depending on the transform operation in question.

In the final stage of the transform processing, in the present example, the output multiplexer 138 reads from the register file 137 and writes the processing result of the current brick to the shared buffer 120 based on the address information received from the sub-block processing logic 131 to construct a (or part of a) corresponding output sub-block in the shared buffer 120. In one example, the output multiplexer 138 may be a write enabled mask for selecting one or more bytes to output; other forms of output multiplexers are of course possible as desired. If the output sub-block requires the processing result of more than one brick, the transformation circuitry 133-136 proceeds to process one or more subsequent bricks and outputs the corresponding processing result to the register file 137, then writes the processing results to the shared buffer 120 to construct the output sub-block.

In the example above, transform operations are performed before elements of a transformed brick are written to the register file 137. However, in some embodiments, one or more transform operations may, alternatively or additionally, be performed after elements of a brick are written to the register file 137, for example by the output multiplexer 138, in which case elements of the transformed brick may be output directly to the shared buffer 120 following the transform operation(s). In other embodiments, stages of transform processing may be arranged differently, for example with the X- and C-alignment stages 134, 135 performed before the alignment outputs are written to the register file 137, with the remaining transform processing by the transform multiplexers 136 and output multiplexers 138 being performed as the elements of the alignment outputs are read out from the register file 137.

In the example above and the following examples, the input register of the above, and each of the following, exemplary tensor transform units has a size of 1×1×4×8 bytes. As such, an input brick that can be read from the shared buffer per processing cycle is of a size of 1×1×4×8 bytes (in the four dimensions N, H, W and C). It will be clear to a skilled reader that other sizes of input registers may be implemented for storing corresponding sizes of input bricks.

In some examples, input tensor data may already be stored in the shared buffer as a result of a prior (same or different) computation performed within the processing resource. In some examples, an output block output by a tensor transform unit according to present embodiments may be directly consumed as an input by another (same or different) processing stage within the processing resource. Thus, a tensor transform unit according to present embodiments may function as a processing stage within a processing resource that performs multiple processing operations, for example, in a computation graph. In this case, as part of an efficient execution of a computation graph, a plurality of processing steps may be performed on a small unit of data, e.g. a block, where intermediate results of each processing step may be stored in the shared buffer and passed from one processing step to the next through the shared storage. The present embodiments facilitate such an arrangement through enabling transform operations to be performed on small units of tensor data such that input and output units of tensor data may be maintained in the limited internal shared storage.

Figure 2:
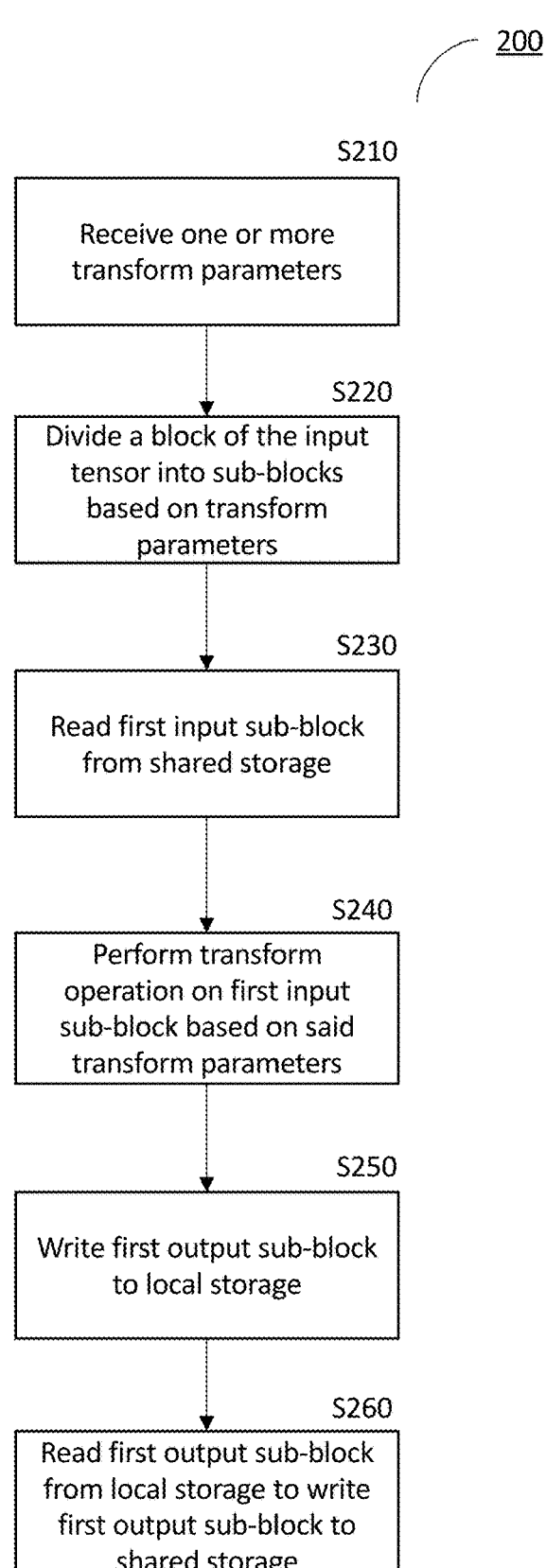
FIG. 2 shows a flow diagram of an exemplary tensor transform method.

FIG. 2 shows a flow diagram illustrating a tensor transform method 200 implemented on a data processing device, e.g. the tensor transform unit 130 of FIG. 1, according to an embodiment. In the present embodiment, the data processing device is provided to a processing resource to perform transform operations on input data tensors for the processing resource. The processing resource comprises a shared storage (e.g. shared buffer 120) for storing an input data tensor on which a transform operation is to be performed, and a control module, which outputs one or more transform parameters that specify the transform operation to be performed on the input data tensor. The data processing device comprises communication circuitry for communicating with the control module and the shared storage of the processing resource, processing circuitry for performing transform operations, and a local storage (e.g. register) for storing processing results following performance of a transform operation by the processing circuitry. The processing circuitry comprises sub-block processing circuitry and transformation circuitry.

The method begins at S210 when the communication circuitry of the data processing device receives one or more transform parameters. The sub-block processing circuitry then divides, at S220, a block of the input tensor that is dispatched to be processed by the data processing device into one or more input sub-blocks based on the transform parameters. According to the one or more input sub-blocks as divided by the sub-block processing circuitry, at S230, the communication circuitry reads a first input sub-block from the shared storage. At S240, the transformation circuitry performs the transform operation on the first input sub-block based on the received transform parameters to generate a first output sub-block. At S250, the transformation circuitry writes the first output sub-block to the local storage, which is read, at S260, by the communication circuitry to write the first output sub-block to the shared storage. As described with reference to FIG. 1, the input sub-block may be divided further into smaller portions or bricks, and the communication circuitry may read the first input sub-block by reading one brick for each processing cycle, such that the transformation circuitry may process each brick in turn and the output sub-block may be constructed in the shared buffer portion by portion as each brick is being processed.

Figure 3:
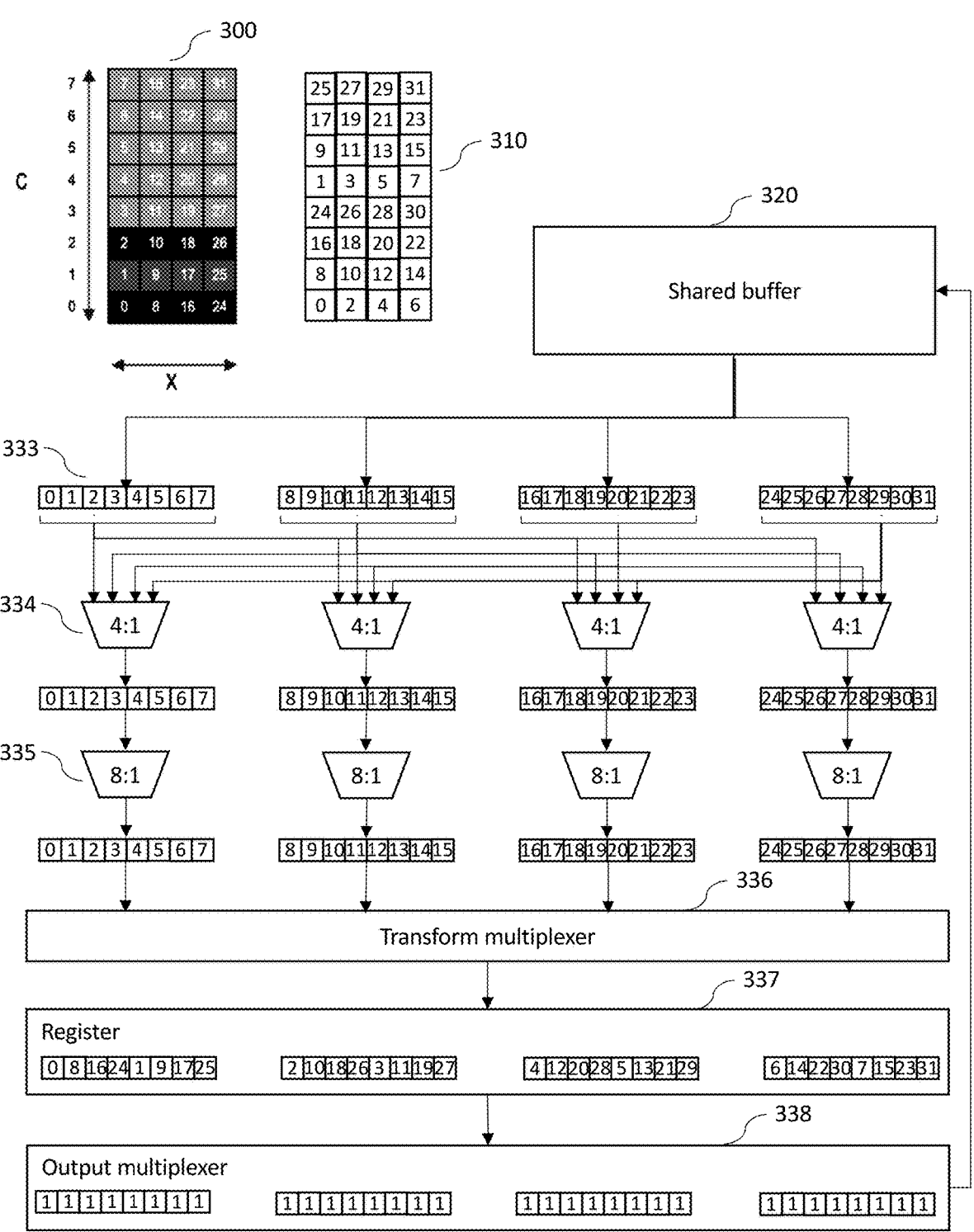
FIG. 3 illustrates an exemplary transpose operation.
Figure 4:
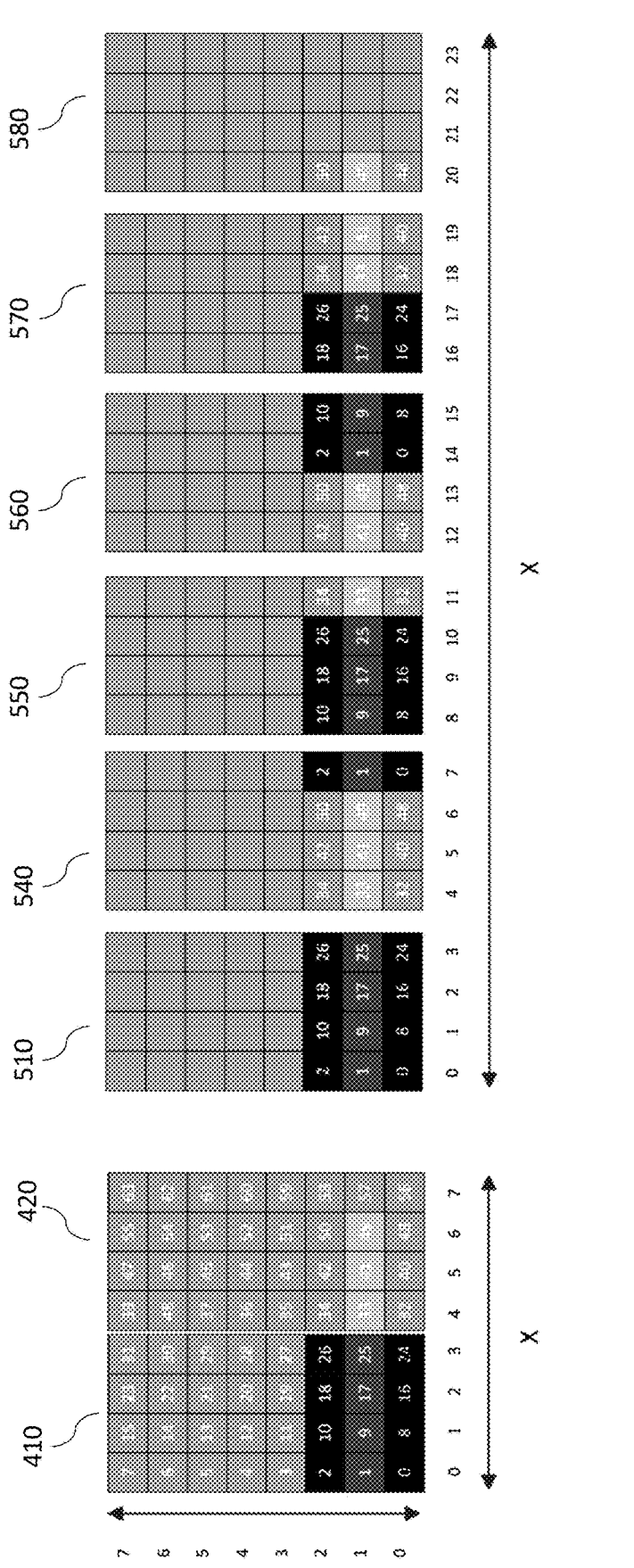
FIG. 4 shows the input and output of an exemplary tile operation.

FIG. 3 illustrates an exemplary transpose operation performed by a tensor transform unit, e.g transform unit 130, according to an embodiment. In the present example, an input sub-block 300 has a dimension of 1×1×4×8 bytes and can be read into input register 333 of the present transform unit. The elements of the input sub-block 300 are written to the input register 333 in order, and then first processed by X-alignment multiplexer 334. In the present example, the four X-elements are passed through the X-alignment multiplexer 334. The outputs of the X-alignment multiplexer 334 are then processed by C-alignment multiplexer 335, which passes all bytes from each channel through. The outputs of the C-alignment multiplexer 335 are then processed by transform multiplexer 336, which in the present example perform a transpose operation on the C-alignment outputs to output transposed results to register 337, and output multiplexer 338 writes the processing results to shared buffer 320 to construct a corresponding output sub-block 310.

FIG. 4 and FIG. 5A to 5G illustrate an exemplary tile operation performed by a tensor transform unit, e.g transform unit 130, according to an embodiment. In the present example, an input sub-block of 1×2×4×8 bytes is required to generate an output sub-block; thus, the input sub-block is divided, e.g. by sub-block processing circuitry 131, into two input bricks 410 and 420.

Figure 5A:
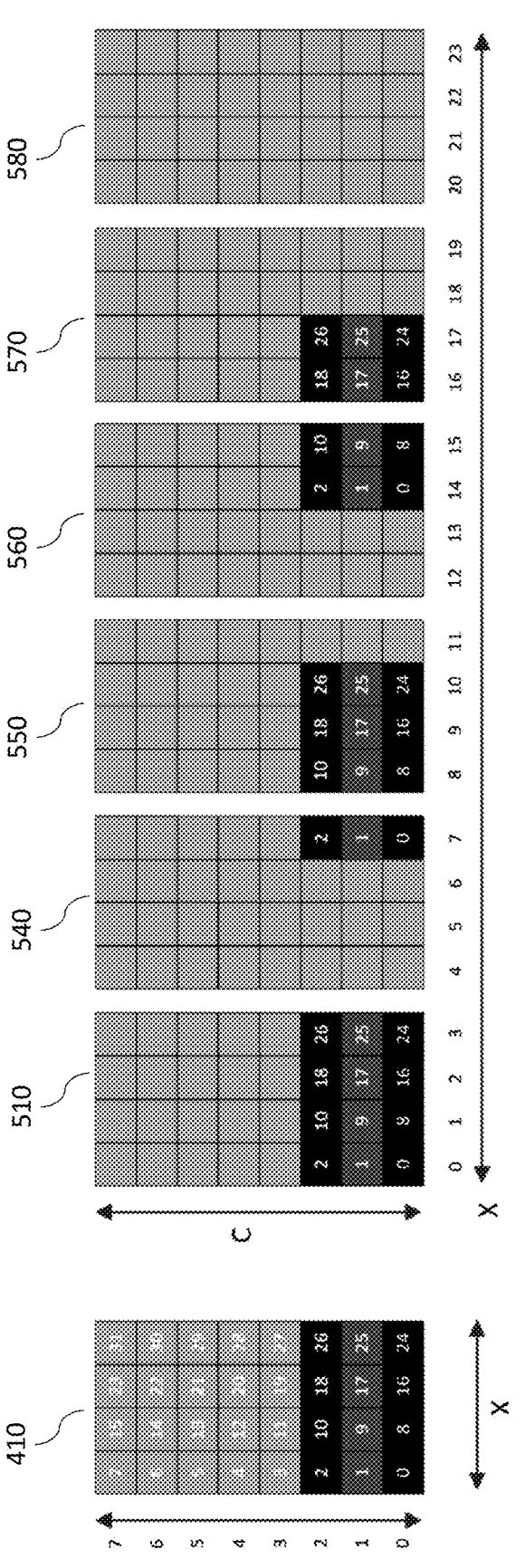
FIGS. 5A to 5G illustrate the exemplary tile operation of FIG. 4.

In the present example, (the amount of data forming) one brick may be read from or written to the shared buffer in each processing cycle. As such, the tile operation begins with the processing of the first of the two input bricks 410, as shown in FIG. 5A, in which the first input brick 410 is read and transformed, and elements of the processing results are selected and written, over several processing cycles, to different data positions of each of the output bricks 510, 540, 550, 560, 570.

Figure 5B:
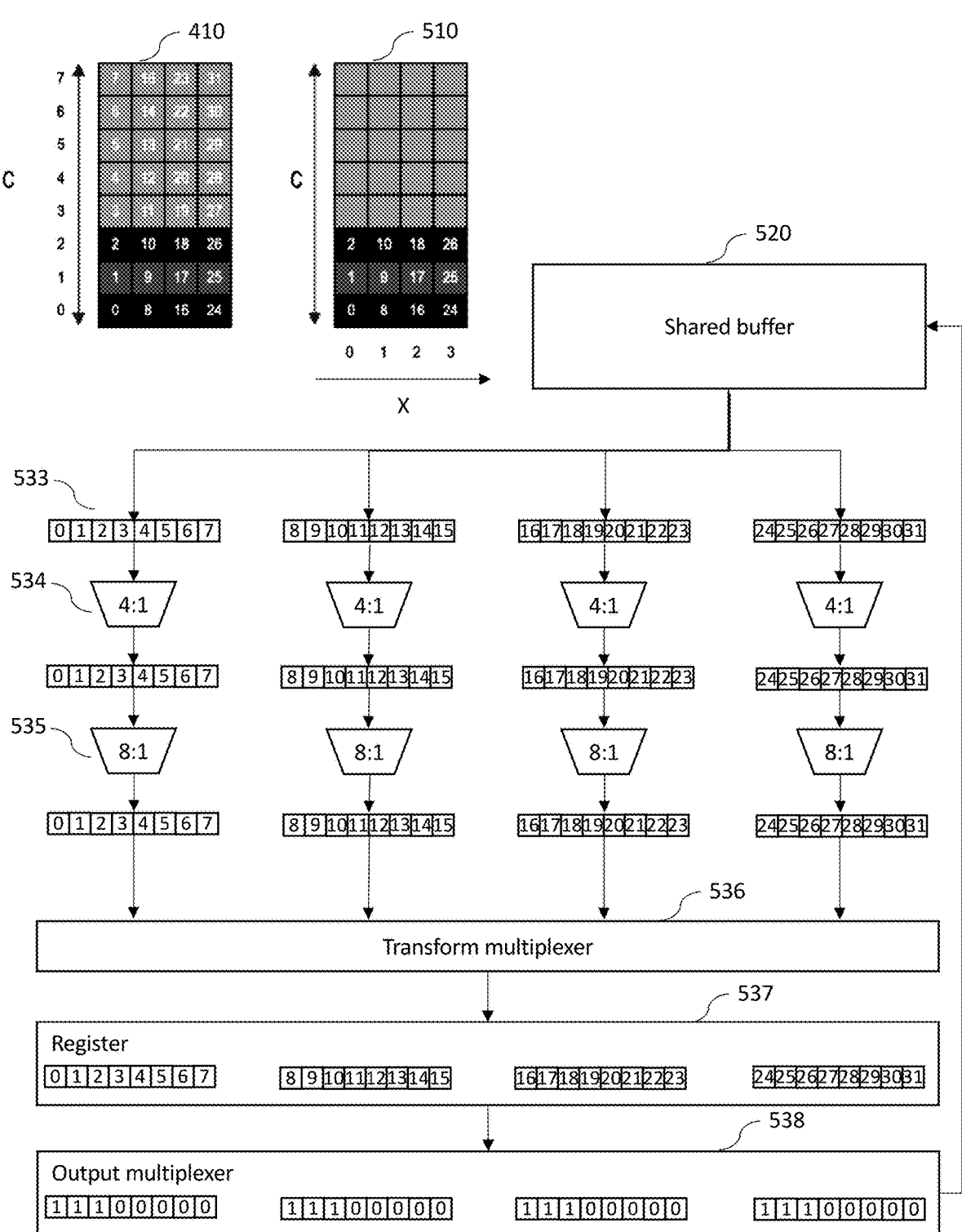

In the first cycle (cycle 0), the input brick 410 is read from shared buffer 520. As shown in FIG. 5B, the elements of the input brick 410 are written to input register 533. In a subsequent cycle (cycle 1), the elements are first processed by X-alignment multiplexer 534, as described with reference to FIG. 1. In this case, no rearrangement in the X-dimension is required and as such the elements simply pass through the X-alignment multiplexer 534. The X-alignment outputs are then processed by C-alignment multiplexer 535. Similarly, no rearrangement in the C-dimension is required and as such the elements simply pass through the C-alignment multiplexer 535. Then, the C-alignment outputs are processed by transform multiplexer 536, which passes the elements through without transformation. The processing results are written to register 537 and output multiplexer 538 applies a write enable mask to the processing results, which selects the first three bytes from each group of 8 bytes of the register 537. Then, at the end of cycle 1, the output multiplexer 538 writes the selected processing results to the shared buffer 520 to construct a corresponding output brick 510.

Figure 5C:
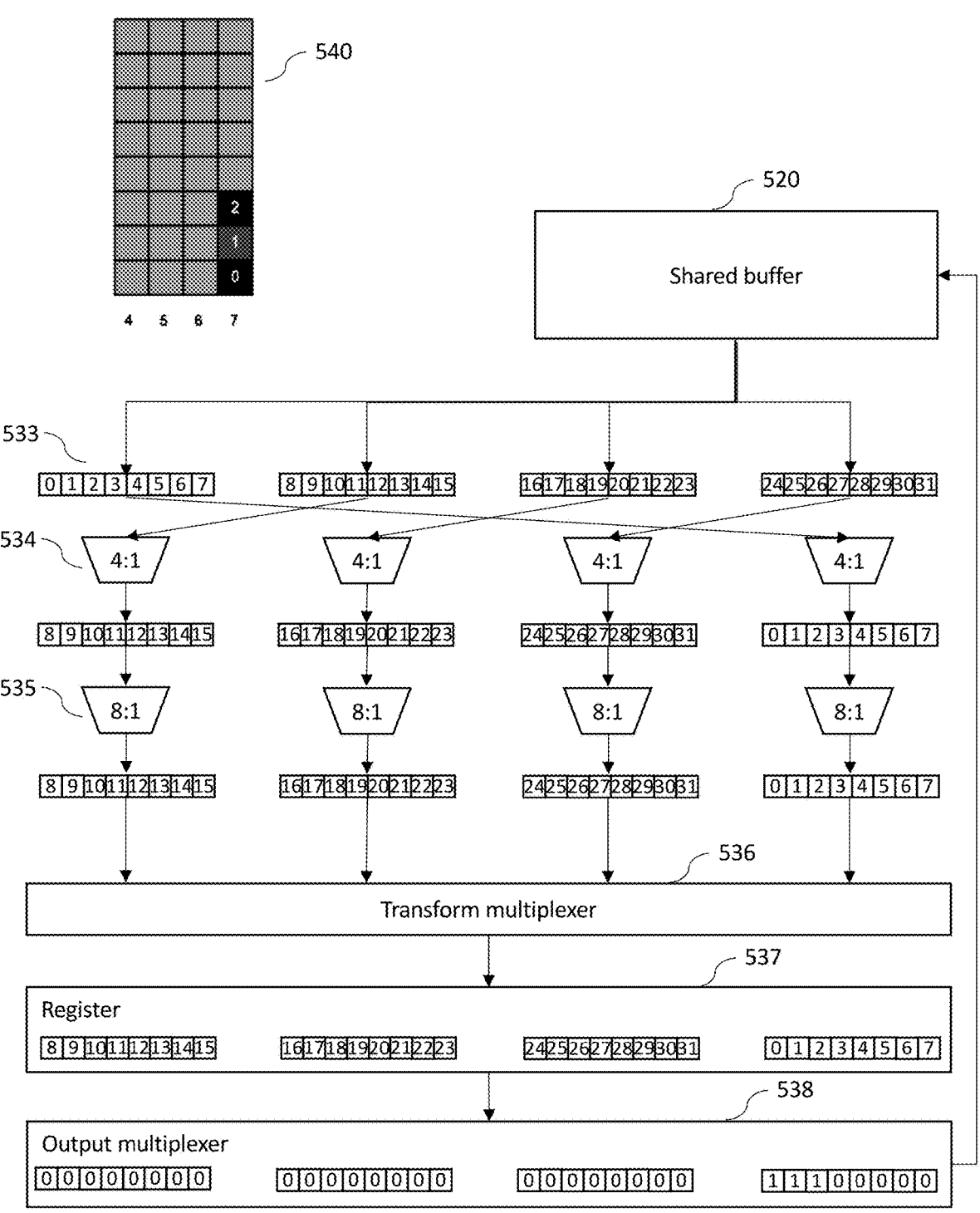

Since the first input brick 410 has already been read from the shared buffer 520 and written to the input register 533, a read cycle is not required to generate the next output brick. As shown in FIG. 5C, the elements of the input brick 410, already written to the input register 533, are processed in a subsequent cycle (cycle 2) by the X-alignment multiplexer 534, which rotates each group of eight channels by three positions in the X-direction. The X-alignment outputs are passed through the C-alignment multiplexer 535. Then, the C-alignment outputs are processed by the transform multiplexer 536, which passes the elements through without transformation. The processing results are written to the register 537 and the output multiplexer 538 applies a write enable mask to the processing results, which selects the first three bytes of the last group of eight bytes from the register 537. Then, at the end of cycle 2, the output multiplexer 538 writes the selected processing results to the shared buffer 520 to construct a corresponding output brick 540.

Figure 5D:
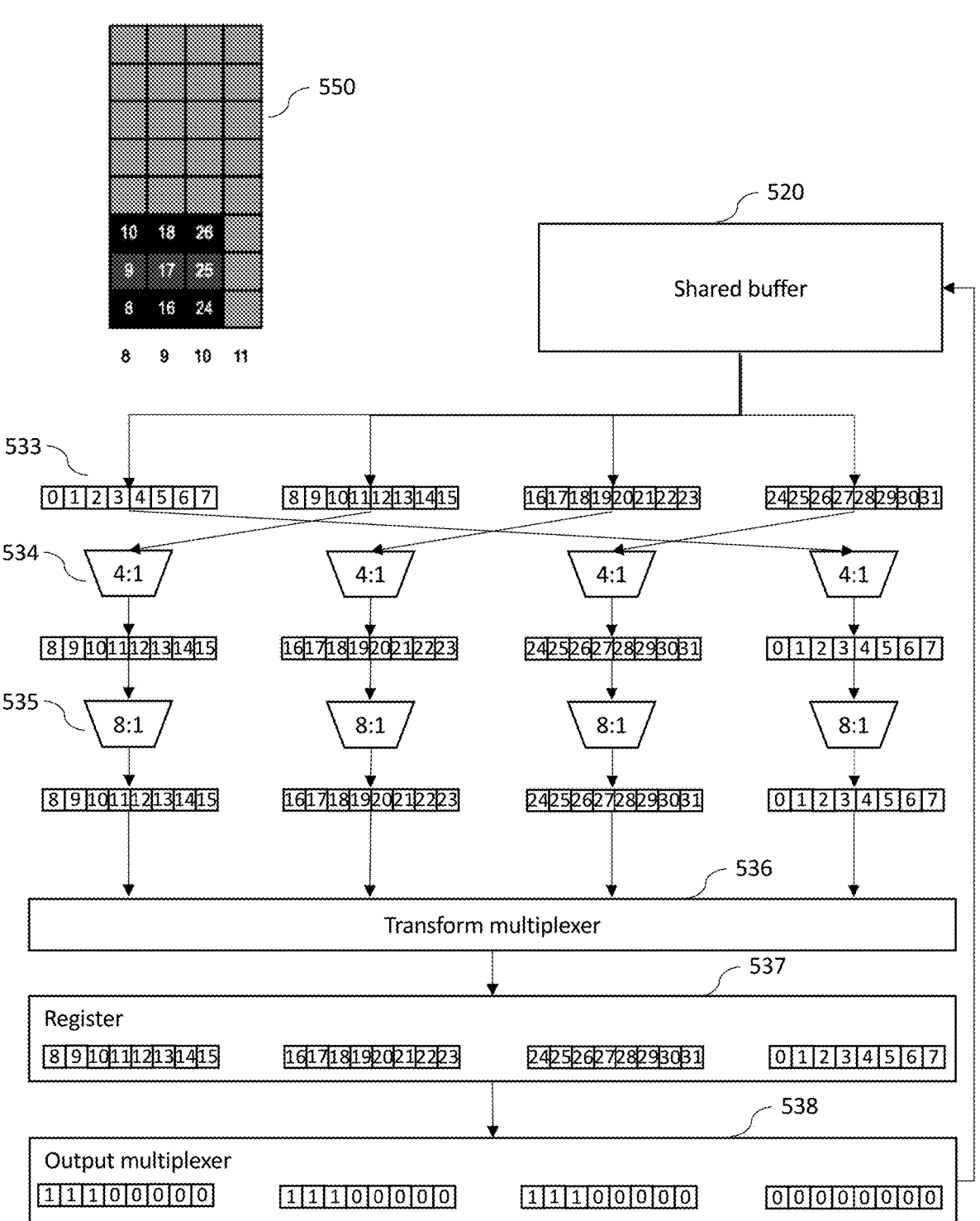

Similarly, as the first input brick 410 has already been read from the shared buffer 520 and written to the input register 533, a read cycle is not required. As shown in FIG. 5D, the input brick 410, already written to the input register 533, is processed in a subsequent cycle (cycle 3) by the X-alignment multiplexer 534, which rotates each group of eight channels by three positions in the X-direction. The X-alignment outputs are passed through the C-alignment multiplexer 535. Then, the C-alignment outputs are processed by the transform multiplexer 536, which passes the elements through without transformation. The processing results are written to the register 537 and the output multiplexer 538 applies a write enable mask to the processing results, which selects the first three bytes of the first three group of eight bytes from the register 534. Then, at the end of cycle 3, the output multiplexer 538 writes the selected processing results to the shared buffer 520 to construct a corresponding output brick 550.

Figure 5E:
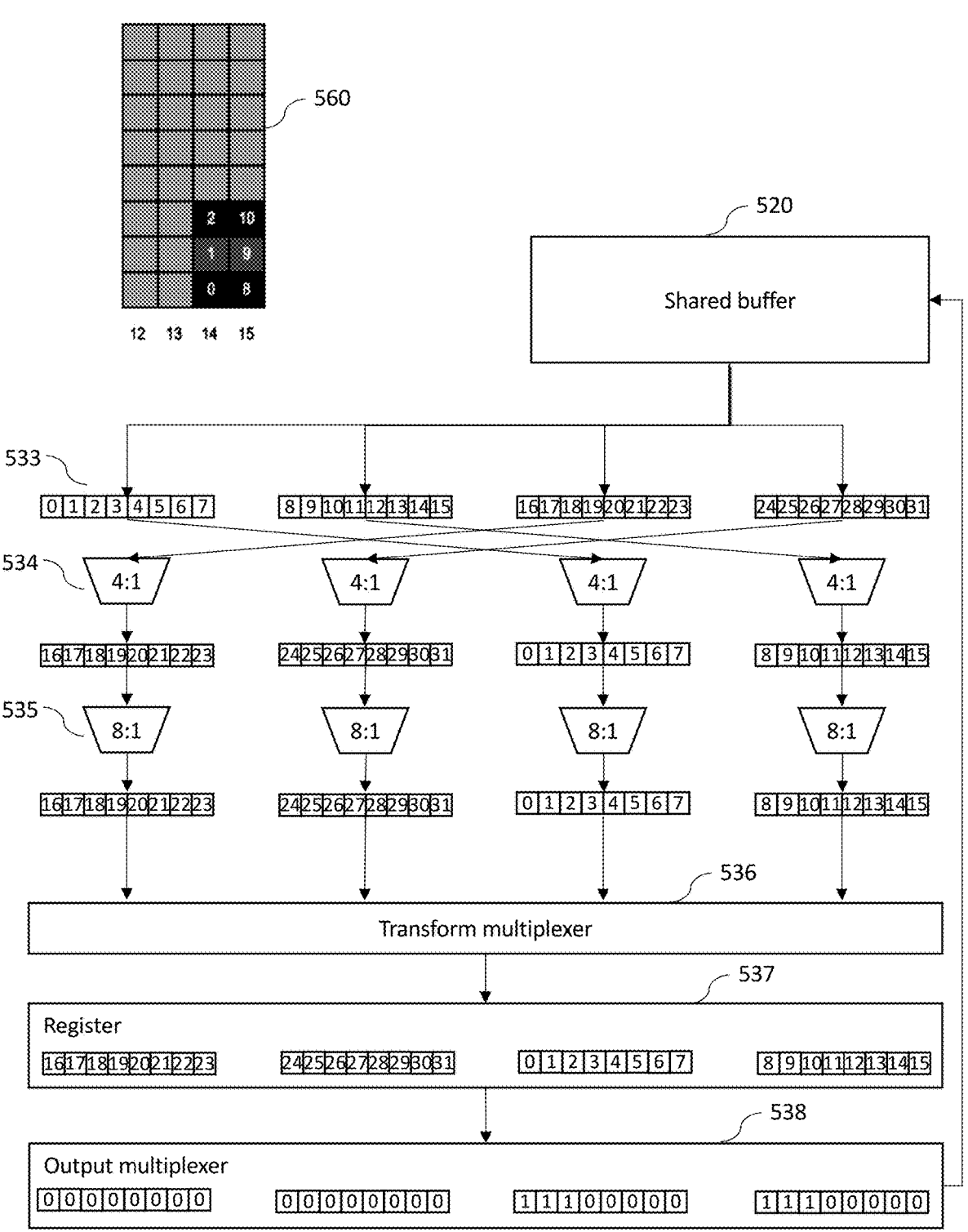

In a subsequent cycle (cycle 4), as shown in FIG. 5E, the input brick 410, already written to the input register 533, is processed by the X-alignment multiplexer 534, which rotates each group of eight channels by two positions in the X-direction. The X-alignment outputs are passed through the C-alignment multiplexer 535. Then, the C-alignment outputs are processed by the transform multiplexer 536, which passes the elements through without transformation. The processing results are written to the register 537 and the output multiplexer 538 applies a write enable mask to the processing results, which selects the first three bytes from the last two group of eight bytes from the register 534. Then, at the end of cycle 4, the output multiplexer 538 writes the selected processing results to the shared buffer 520 to construct a corresponding output brick 560.

Figure 5F:
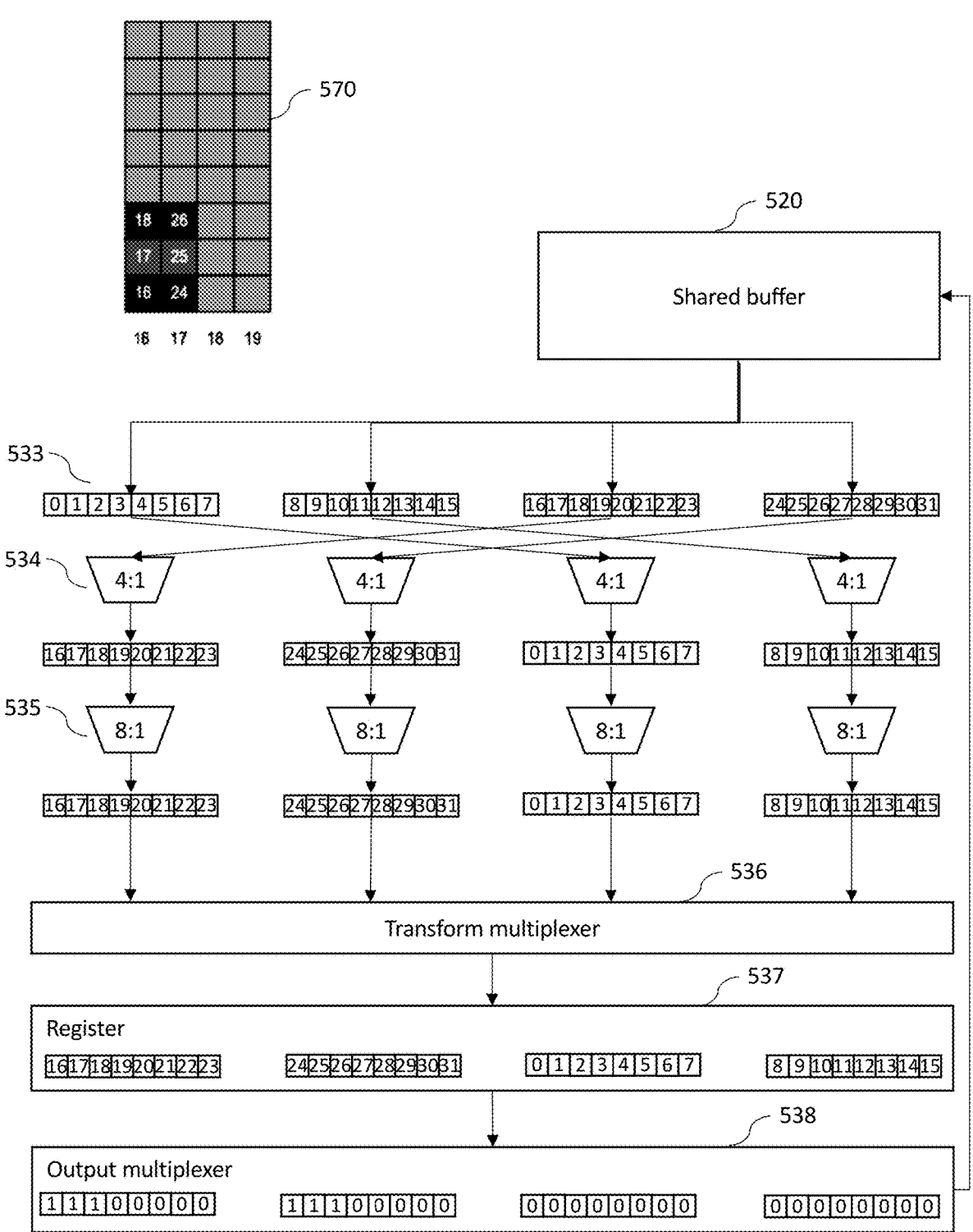

In a subsequent cycle (cycle 5), as shown in FIG. 5F, the input brick 410, already written to the input register 533, is processed by the X-alignment multiplexer 534, which rotates each group of eight channels by two positions in the X-direction. The X-alignment outputs are passed through the C-alignment multiplexer 535. Then, the C-alignment outputs are processed by the transform multiplexer 536, which passes the elements through without transformation. The processing results are written to the register 537 and the output multiplexer 538 applies a write enable mask to the processing results, which selects the first three bytes from the first two group of eight bytes from the register 537. Then, at the end of cycle 5, the output multiplexer 538 writes the selected processing results to the shared buffer 520 to construct a corresponding output brick 570.

Figure 5G:
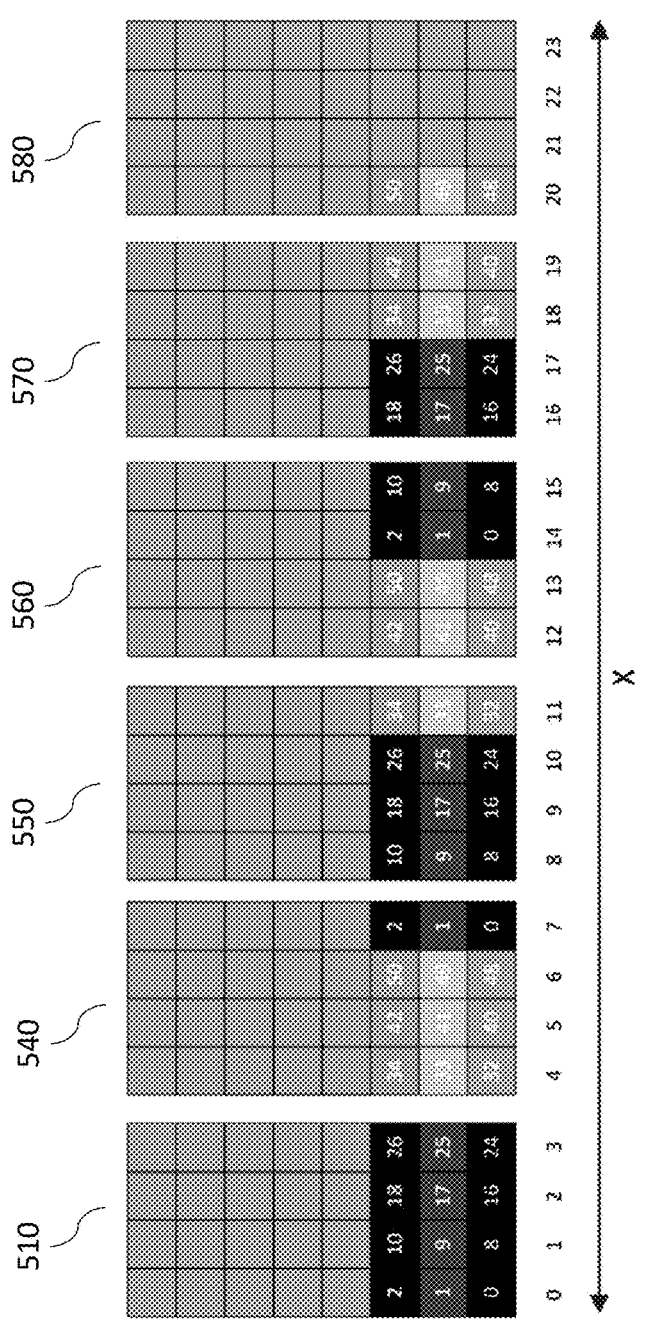
Figure 5G:
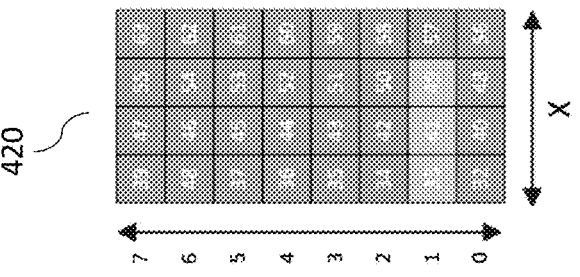

Next, the tile operation continues with the processing of the second of the two input bricks 420, as shown in FIG. 5G, in which the second input brick 420 is read, processed and written, over several processing cycles similar to the processing of the first input brick 410 as described with reference to FIGS. 5B to 5F, to different data positions of each of the output bricks 540, 550, 560, 570, 580.

Figure 6A:
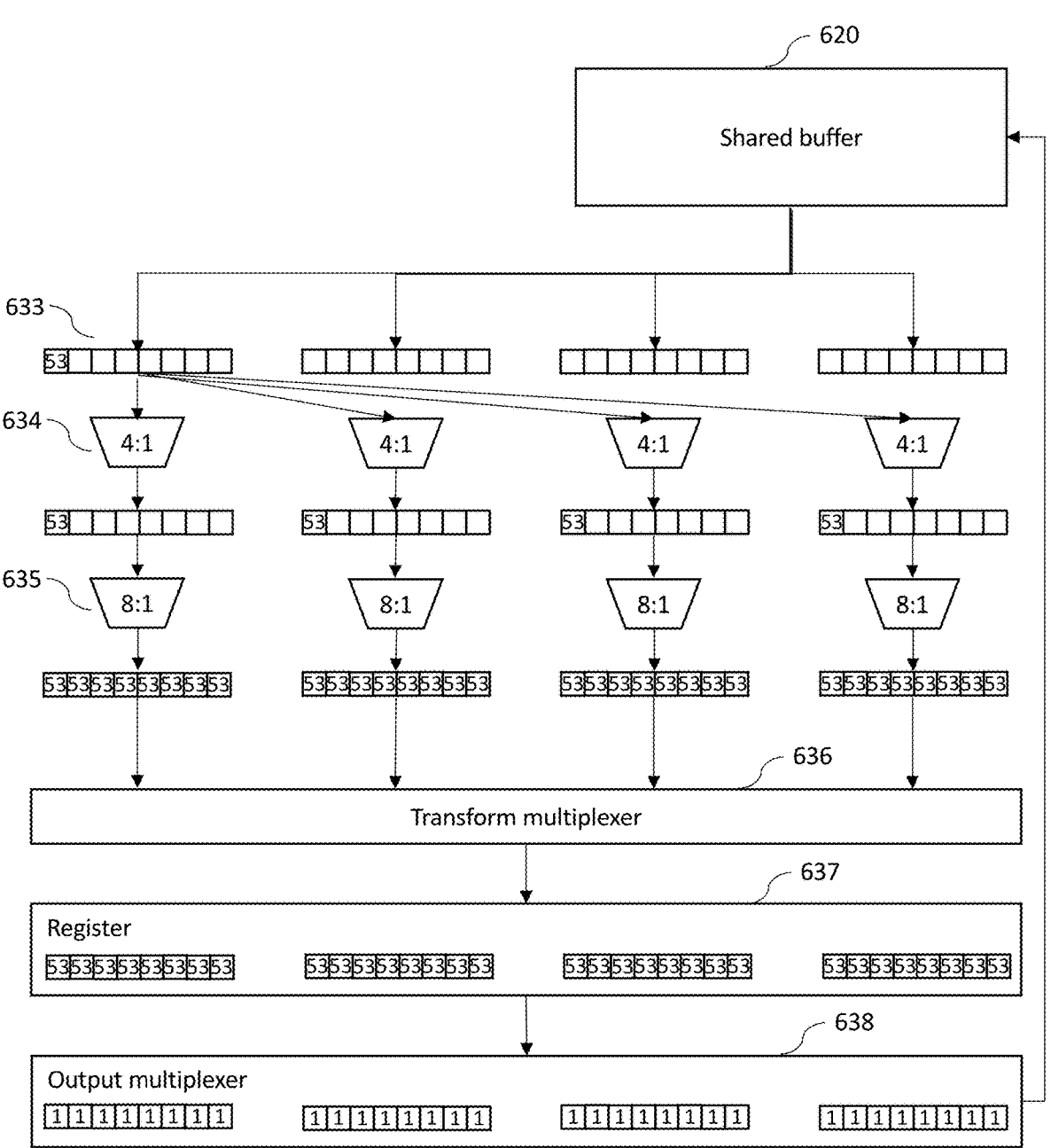
FIGS. 6A to 6C illustrate an exemplary pad operation.
Figure 6B:
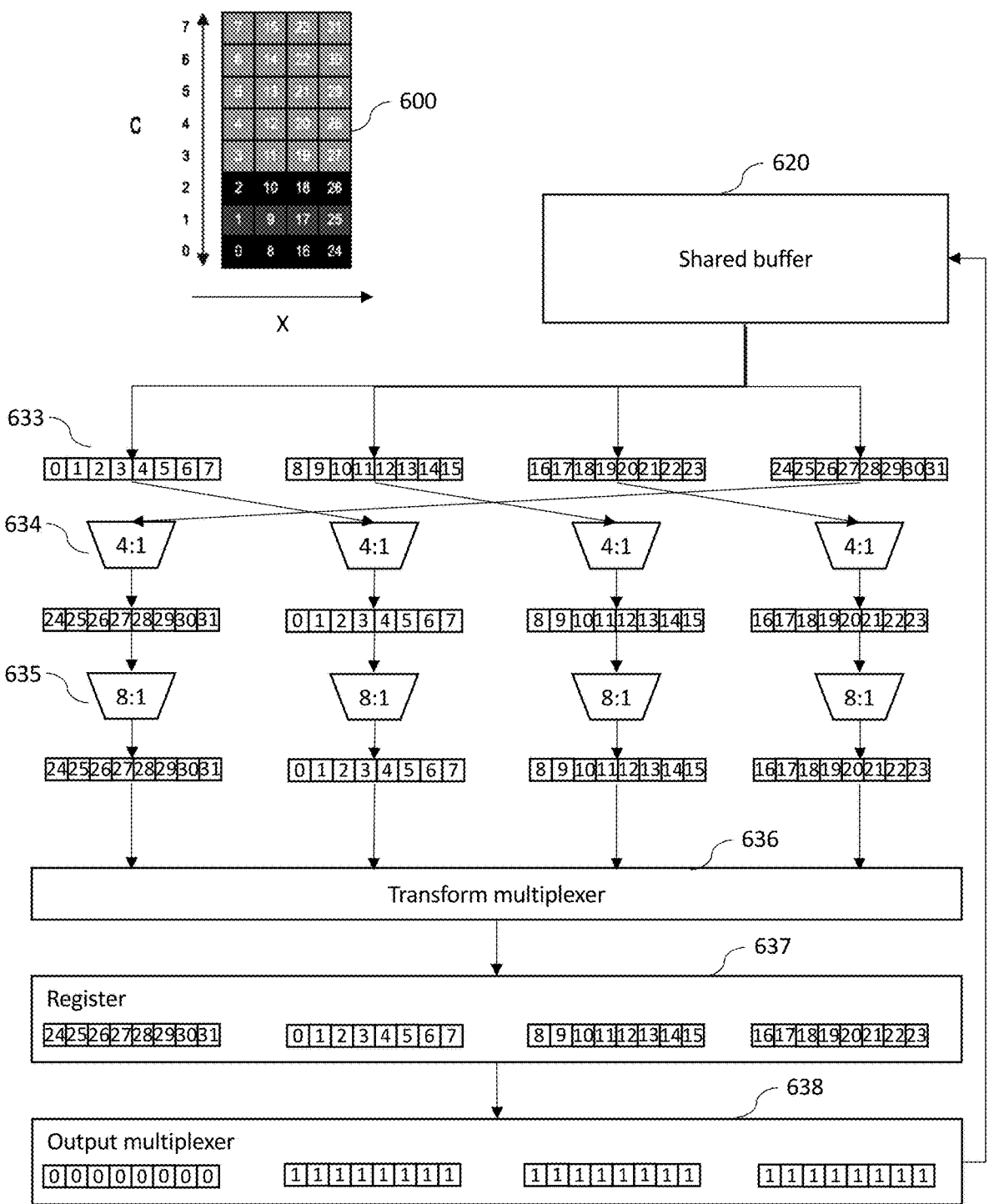
Figure 6C:
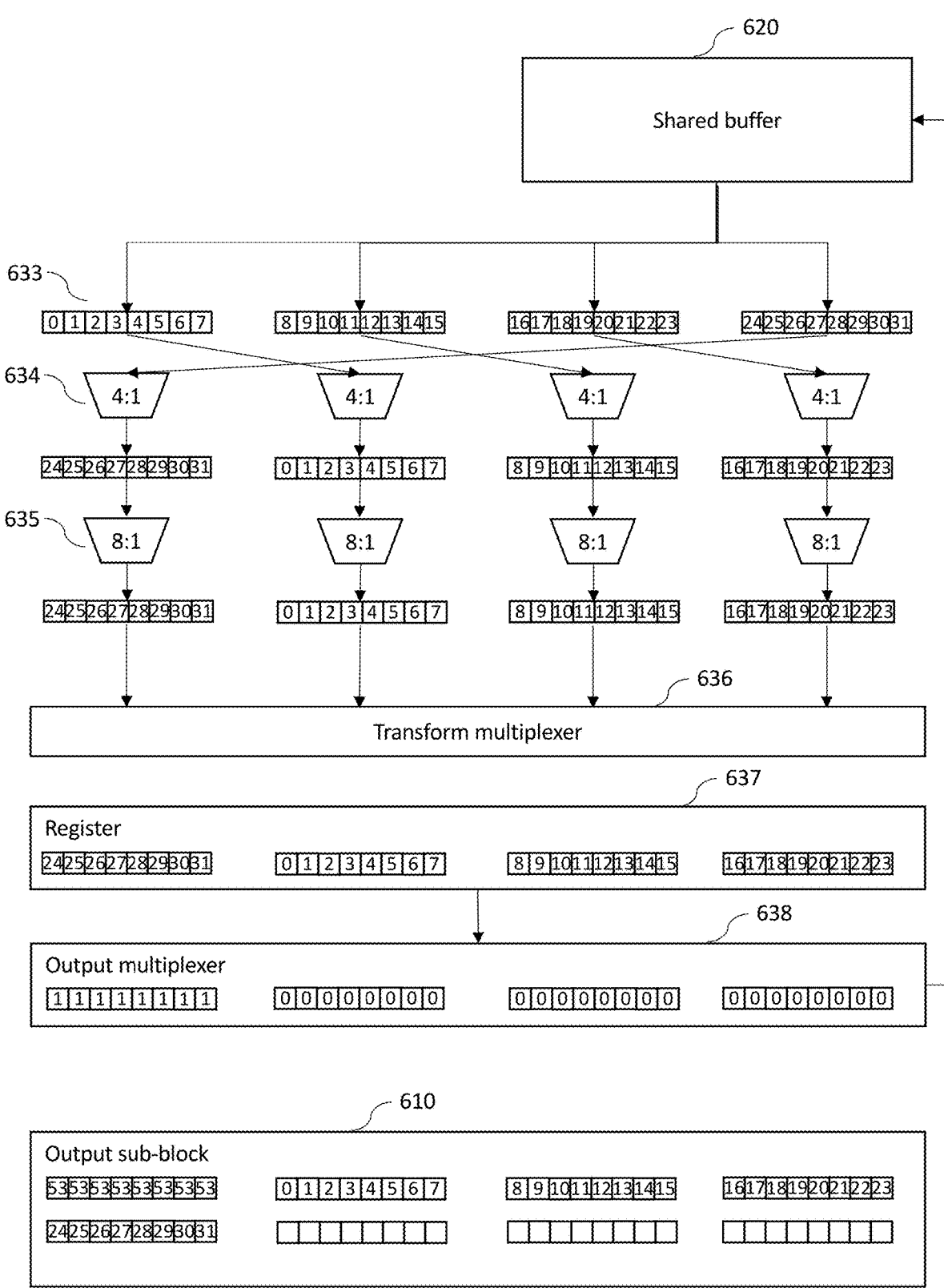

FIGS. 6A to 6C illustrate an exemplary pad operation performed by a tensor transform unit, e.g transform unit 130, according to an embodiment. The present example comprises padding by a value (e.g. 53) in the X dimension. In the present example, only a single brick 600 of 1×1×4×8 bytes is required and as such an input sub-block is a single brick in size.

As shown in FIG. 6A, the operation begins with the writing of a pad constant "53" in the first cycle to the first byte of the first group of eight bytes of input register 633. Then, X-alignment multiplexer 634 replicates the first group of eight bytes three times such that the first byte of each group of eight bytes in the X-alignment outputs comprises the pad constant. Next, C-alignment multiplexer 635 replicates the first byte of each group of eight bytes to fill all data positions. Then, the C-alignment outputs are processed by transform multiplexer 636, which passes the elements through without transformation. The processing results are output to register 637, and output multiplexer 638 applies a write enable mask to the processing results, which selects all bytes from every group of eight bytes and writes the selected processing results to the shared buffer 620 to construct a corresponding output sub-block.

Next, as shown in FIG. 6B, the operation continues in the next cycle with the reading of the input brick 600 from the shared buffer 620, and the elements of the input brick 600 are written to the input register 633. In the subsequent cycle, the elements are first processed by the X-alignment multiplexer 634, which rotates each group of eight channels by one position in the X-direction. The X-alignment outputs are then processed by the C-alignment multiplexer 635, which simply allows the elements to pass through. Then, the C-alignment outputs are processed by the transform multiplexer 636, which passes the elements through without transformation. The processing results are written to the register 637 and the output multiplexer 638 applies a write enable mask to the processing results, which selects all bytes from the last three group of eight bytes from the register 637. Then, at the end of the current cycle, the output multiplexer 638 writes the selected processing results to the shared buffer 620 to construct the output sub-block.

Lastly, as shown in FIG. 6C, the operation continues in the last cycle with the elements of the input brick 600 already written to the input register 633, and the elements are first processed by the X-alignment multiplexer 634, which rotates each group of eight channels by one position in the X-direction. The X-alignment outputs are then processed by the C-alignment multiplexer 635, which allows the elements to pass through. Then, the C-alignment outputs are processed by the transform multiplexer 636, which passes the elements through without transformation. The processing results are written to the register 637 and the output multiplexer 638 applies a write enable mask to the processing results, which selects all bytes from the first group of eight bytes from the register 637. Then, at the end of the cycle, the output multiplexer 638 writes the selected processing results to the shared buffer 620 to complete the construction of the output sub-block 610.

Figure 7:
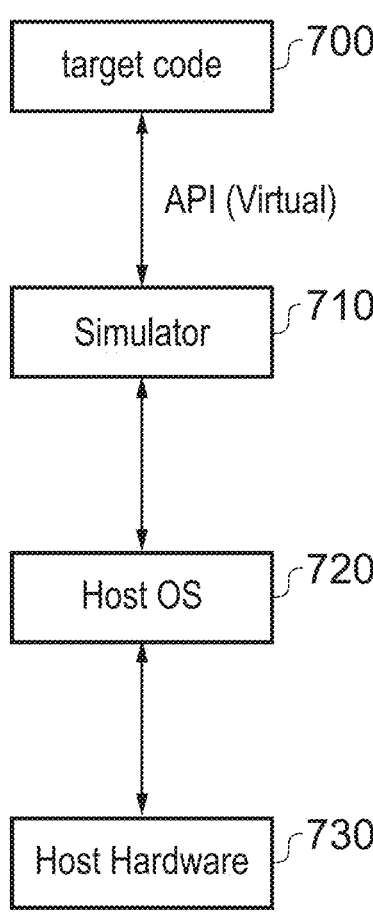
FIG. 7 shows a simulator implementation.

In an alternative embodiment, FIG. 7 illustrates a simulator implementation of the present technology. Whilst the earlier described embodiments implement the present technology in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software-based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on host hardware (for example, host processor 730), some simulated embodiments may make use of the host hardware, where suitable.

The simulator program 710 may be stored on a computer-readable storage medium (which may be a non-transitory storage medium), and provides a program interface (instruction execution environment) to target code 700 which is the same as the application program interface of the hardware architecture being modelled by the simulator program 710. Thus, the program instructions of the target code 700, such as the method 200 described above, may be executed from within the instruction execution environment using the simulator program 710, so that a host computer 730 which does not actually have the hardware features of the apparatus discussed above can emulate these features.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present technique.

The invention claimed is:

1. A data processing apparatus for a processing resource to perform a transform operation on an input tensor for said processing resource, said input tensor being formed of a plurality of blocks, each block being a portion of said input tensor capable of being operated on independently of each other, said data processing apparatus comprising:

communication circuitry to communicate with a control module and a shared storage of said processing resource;

processing circuitry to perform said transform operation, said processing circuitry comprising sub-block processing circuitry and transformation circuitry; and a local tensor transform unit storage to store transform operation output from said processing circuitry;

wherein said communication circuitry is configured to:

receive one or more transform parameters;

read a first input sub-block from said shared storage, said first input sub-block being a portion of a first block of said input tensor corresponding to a processing unit of said processing circuitry; and write a first output sub-block to said shared storage, wherein said sub-block processing circuitry is configured to:

divide said first block of said first input tensor into one or more input sub-blocks capable of being operated on independently of each other wherein a size of said input sub-blocks is based on said one or more transform parameters and a maximum size of said input sub-blocks wherein the maximum size corresponds to a maximum amount of data that can be stored in the local tensor transform unit storage;

upon division of said input tensor into one or more input sub-blocks, further divide, by said sub-block processing circuitry, a first input sub-block into a plurality of bricks, each brick being a portion of said first input sub-block capable of being operated on independently of each other;

wherein said transformation circuitry is configured to, subsequent to division of said first input sub-block into said plurality of bricks:

perform said transform operation on a first brick of said plurality of bricks based on said one or more transform parameters, wherein operation on each brick of said plurality of bricks in turn generates a first output sub-block corresponding to said first input sub-block; and upon generation of said first output sub-block, write said first output sub-block to said local tensor transform unit storage.

2. The data processing apparatus of claim 1, wherein said sub-block processing circuitry is configured to divide said first input sub-block into a plurality of bricks such that each brick corresponds to a data array size capable of being read from or written to said shared storage of said processing resource in a single processing cycle.

3. The data processing apparatus of claim 1, wherein said one or more transform parameters comprises an indication for a number of bricks required for said transform operation, and wherein said sub-block processing circuitry is configured to select said number of bricks required to form said first input sub-block.

4. The data processing apparatus of claim 3, wherein each of said plurality of bricks is a multidimensional data array, and said transformation circuitry is configured to perform said transform operation on said first input sub-block by processing one of said number of bricks required for said transform operation in each dimension of said multidimensional data array in turn.

5. The data processing apparatus of claim 1, wherein said sub-block processing circuitry comprises address generating circuitry to generate address information specifying said one or more input sub-blocks of said first block of said input tensor.

6. The data processing apparatus of claim 5, wherein said communication circuitry is configured to read said first input sub-block from said shared storage based on said address information.

7. The data processing apparatus of claim 5, wherein said transformation circuitry is configured to arrange said first output sub-block in said local tensor transform unit storage based on said address information.

8. The data processing apparatus of claim 5, wherein said communication circuitry is configured to write said first output sub-block to said shared storage based on said address information.

9. The data processing apparatus of claim 5, wherein said processing circuitry further comprises output circuitry to select data stored in said local tensor transform unit storage based on said one or more transform parameters to be written as said first output sub-block to said shared storage based on said address information.

10. The data processing apparatus of claim 5, wherein said address information comprises data positions of said one or more input sub-blocks in said shared storage and data positions of said first output sub-block in said local tensor transform unit storage.

11. The data processing apparatus of claim 1, wherein said one or more transform parameters comprise one or more parameters specifying an input tensor size, one or more parameters specifying an output tensor size, a location of said shared storage, one or more parameters defining said transform operation, one or more parameters specifying traversal through said input tensor and output tensors tensor to divide into said one or more input sub-blocks, or any combination thereof.

12. The data processing apparatus of claim 1, wherein writing said first output sub-block comprises writing in whole bricks.

13. A computer-implemented method of performing a transform operation on an input tensor by a data processing apparatus for a processing resource, said input tensor being formed of a plurality of blocks, each block being a portion of said input tensor capable of being operated on independently of each other, said method comprising:

communicating by communication circuitry with a control module and a shared storage of said processing resource;

performing by processing circuitry said transform operation, said processing circuitry comprising sub-block processing circuitry and transformation circuitry; and storing, by a local tensor transform unit storage, a transform operation output from said processing circuitry;

wherein said method further comprises:

receiving, by said communication circuitry, one or more transform parameters;

dividing, by said sub-block processing circuitry, a first block of said input tensor into one or more input sub-blocks wherein a size of said one or more input sub-blocks is based on said one or more transform parameters and a maximum size of said input sub-blocks wherein the maximum size corresponds to a maximum amount of data that can be stored in the local tensor transform unit storage, each input sub-block being a portion of said first block of said input tensor corresponding to a processing unit of said processing circuitry and capable of being operated on independently of each other;

upon dividing said input tensor into one or more input sub-blocks, further dividing by said sub-block processing circuitry a first input sub-block into a plurality of bricks, each brick being a portion of said first input sub-block capable of being operated on independently of each other;

subsequent to the dividing of said first input sub-block into said plurality of bricks:

reading by said communication circuitry a first brick of said plurality of bricks from said shared storage; and performing, by said transformation circuitry, said transform operation on said first input brick based on said one or more transform parameters, wherein operating on each brick of said plurality of bricks in turn generates a first output sub-block corresponding to said first input sub-block;

upon generating said first output sub-block, storing by said transformation circuitry said first output sub-block to said local tensor transform unit storage; and writing by said transformation circuitry said first output sub-block to said shared storage.

14. The method of claim 13, wherein said one or more transform parameters comprises an indication for a number of bricks required for said transform operation, and the method further comprising selecting by said sub-block processing circuitry said number of bricks required to form said first input sub-block, wherein, optionally, each of said plurality of bricks is a multidimensional data array, and the method further comprising performing by said transformation circuitry said transform operation on said first input sub-block comprises processing one of said number of bricks required for said transform operation in each dimension of said multidimensional data array in turn.

15. The method of claim 13, wherein said sub-block processing circuitry comprises address generating circuitry, the method further comprising generating, by said address generating circuitry, address information specifying said one or more input sub-blocks of said first block of said input tensor.

16. The method of claim 15, further comprising sending by said communication circuitry said address information specifying said one or more input sub-blocks of said first block of said input tensor to said shared storage, wherein said communication circuitry reads said first input sub-block from said shared storage based on said address information, and wherein said communication circuitry writes said first output sub-block to said shared storage based on said address information.

17. The method of claim 15, wherein said processing circuitry further comprises output circuitry, the method further comprising selecting, by said output circuitry, data stored in said local tensor transform unit storage based on said one or more transform parameters and writing the selected data to said first output sub-block to said shared storage based on said address information.

18. A program product stored on a non-transitory computer-readable medium computer program comprising instructions for controlling a host data processing apparatus to provide an instruction execution environment to perform a transform operation on an input tensor, said input tensor being formed of a plurality of blocks, each block being a portion of said input tensor capable of being operated on independently of each other, said instruction execution environment comprising:

communication program logic to communicate with a control module and a shared storage of said host data processing apparatus;

processing program logic to perform said transform operation, said processing program logic comprising sub-block processing program logic and transformation program logic; and a local tensor transform unit storage to store a transform operation output from said processing program logic;

wherein said communication program logic is configured to:

receive one or more transform parameters;

read a first input sub-block from said shared storage, said first input sub-block being a portion of a first block of said input tensor corresponding to a processing unit of said processing program logic; and write a first output sub-block to said shared storage, wherein said sub-block processing program logic is configured to:

divide said first block of said first input tensor into one or more input sub-blocks capable of being operated on independently of each other wherein a size of said input sub-blocks is based on said one or more transform parameters and a maximum size of said input sub-blocks wherein the maximum size corresponds to a maximum amount of data that can be stored in the local tensor transform unit storage; and upon division of said input tensor into one or more input sub-blocks, further divide, by said sub-block processing circuitry, a first input sub-block into a plurality of bricks, each brick being a portion of said first input sub-block capable of being operated on independently of each other;

wherein said transformation circuitry is configured to, subsequent to division of said first input sub-block into said plurality of bricks:

perform said transform operation on a first brick of said plurality of bricks based on said one or more transform parameters, wherein operation on each brick of said plurality of bricks in turn generates a first output sub-block corresponding to said first input sub-block; and upon generation of said first output sub-block, write said first output sub-block to said local tensor transform unit storage.

\* \* \* \* \*